United States Patent
Sorokin et al.

(10) Patent No.: US 9,699,413 B2
(45) Date of Patent: Jul. 4, 2017

(54) METHOD FOR ALLOCATING A VIDEO CONFERENCING TASK TO A PROCESSING DEVICE

(71) Applicant: ALE INTERNATIONAL, Colombes (FR)

(72) Inventors: Roman Sorokin, Colombes (FR); Moulay Fadili, Colombes (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 15/079,373

(22) Filed: Mar. 24, 2016

(65) Prior Publication Data

US 2016/0286165 A1 Sep. 29, 2016

(30) Foreign Application Priority Data

Mar. 27, 2015 (EP) ..................................... 15305454

(51) Int. Cl.

| | |
|---|---|
| *H04N 7/15* | (2006.01) |
| *G06F 9/50* | (2006.01) |
| *H04L 12/18* | (2006.01) |
| *H04L 12/26* | (2006.01) |
| *H04L 29/08* | (2006.01) |

(52) U.S. Cl.
CPC ............. *H04N 7/15* (2013.01); *G06F 9/5083* (2013.01); *H04L 12/1818* (2013.01); *H04L 12/1827* (2013.01); *H04L 43/0852* (2013.01); *H04L 67/1008* (2013.01); *H04N 7/152* (2013.01)

(58) Field of Classification Search
CPC ............. H04N 7/15; H04N 7/152; H04N 7/14
USPC ............................................ 348/14.01–14.16
See application file for complete search history.

(56) References Cited

U.S. PATENT DOCUMENTS

| | | | |
|---|---|---|---|
| 2006/0029092 A1* | 2/2006 | Luo ..................... | H04L 12/1827 370/432 |
| 2008/0228926 A1* | 9/2008 | Shiratzky ............ | H04L 65/1069 709/228 |
| 2014/0002584 A1* | 1/2014 | Moon .................. | H04L 12/1818 348/14.08 |
| 2014/0267571 A1* | 9/2014 | Periyannan .............. | H04N 7/15 348/14.08 |

OTHER PUBLICATIONS

European Search Report with regard to EP15305454 dated Aug. 31, 2015.

* cited by examiner

*Primary Examiner* — Melur Ramakrishnaiah
(74) *Attorney, Agent, or Firm* — BCF LLP (57) ABSTRACT

A method for allocating a video conferencing task within a computer network comprising a plurality of candidate processing devices, the method comprising: for each of the candidate processing devices: determining a topological score, the topological score being a function of at least one end-to-end delay between a pair of participating endpoints through the candidate processing device; for each candidate processing device within at least a subset of the candidate processing devices: determining an availability score, the availability score being a function of an available processing capacity of the candidate processing device; selecting a preferred processing device among the candidate processing devices as a function of the topological scores and of the availability scores, and allocating the video conferencing task to the preferred processing device.

11 Claims, 4 Drawing Sheets

METHOD FOR ALLOCATING A VIDEO CONFERENCING TASK TO A PROCESSING DEVICE

CROSS-REFERENCE TO RELATED APPLICATION

This United States Non-Provisional Patent Application claims priority from European Patent Application Serial No. EP 15 30 5454.9, filed on Mar. 27, 2015, the entire content of which is incorporated herein by reference.

FIELD OF THE INVENTION

The invention relates to a method for video processing for video conferencing.

BACKGROUND

Along with the increase of bandwidth capabilities in communication systems, video communication systems have become increasingly popular in both business and residential applications. Indeed, in the case of geographically distributed team collaboration, these systems avoid the travelling of the team collaborators and increase flexibility.

Videoconferencing technologies use video and audio communication to allow a plurality of people to communicate at a same time, for instance for meeting activities. Furthermore, besides the audio and visual transmission of meeting activities, videoconferencing technologies can be used to share documents and display information.

Each user participating to a videoconference is filmed by a camera at an endpoint. The camera generates a video stream representing the user in his/her own environment.

In order to process the video streams during a Video conference, all captured video streams from N users equipped with N endpoints are sent to a dedicated powerful video conference server. The dedicated video conference server then generates conference video streams from received captured video streams. The generated conference video streams are sent to each endpoint of each user participating to the video conference.

SUMMARY

An aspect of the invention is to distribute a plurality of video processing tasks to a plurality of processing devices of the computer network (for example, such as those already deployed in an enterprise: PCs, desk phones, laptops, generic servers, etc.) in an efficient and economical way.

In an embodiment, the invention provides a method for allocating a video conferencing task within a computer network, wherein the video conferencing task relates to a video conference, wherein the computer network comprises a plurality of endpoints intended to participate in the video conference and a plurality of candidate processing devices, the method comprising:

for each of the candidate processing devices:
  determining a topological score for the candidate processing device, the topological score being a function of at least one end-to-end delay between a pair of participating endpoints through the candidate processing device,
for each candidate processing device within at least a subset of the candidate processing devices:
  determining an availability score for the candidate processing device, the availability score being a function of an available processing capacity of the candidate processing device,
selecting a preferred processing device among the candidate processing devices as a function of the topological scores and of the availability scores, and
allocating the video conferencing task to the preferred processing device.

Thanks to these features, the preferred candidate processing device is selected among a plurality of processing devices for executing a video conferencing task. Thanks to these features, the video processing task can be distributed or re-distributed to the candidate processing devices in real-time.

According to embodiments, such method may comprise one or more of the features below.

There are various ways of implementing candidate processing devices in a computer network, the candidate processing devices may be implemented in any network elements capable of processing video contents, e.g. media servers.

In an embodiment, the topological score is a function of an average video conference delay, wherein the average video conference delay is the average value of the end-to-end delay between all pairs of the participating endpoints through the candidate processing device.

In an embodiment, the topological score is a function of a longest video conference delay, wherein the longest videoconference delay is the longest of the end-to-end delay between all pairs of the participating endpoints through the candidate processing device.

Thanks to these features, the preferred candidate processing device is selected in order to allow video conferencing without delay impairments.

In an embodiment, the computer network comprises a plurality of Local Area Networks, wherein the participating endpoints and the candidate processing devices are located in the LANs, and wherein a Wide Area Network interconnects the LANs,
  the method further comprises:
  selecting a path for connecting a pair of participating endpoints through the candidate processing device, the path consisting of at least one LAN segment located in a LAN and/or at least one WAN segment located in the WAN,
  allocating a delay contribution to each LAN segment of the selected path,
  allocating a delay contribution to each WAN segment of the selected path,
  determining the end-to-end delay between the endpoints of the pair of participating endpoints as a sum of the delay contributions of the at least one LAN segment and/or at least one WAN segment constituting the path.

In an embodiment, the delay contribution of a WAN segment is longer than a delay contribution of a LAN segment.

In an embodiment, the method further comprises selecting a path for connecting each pair of endpoints through the candidate processing device.

In an embodiment, the topological score is a function of the bandwidth consumption of the video conference on the WAN segments connecting each participating endpoint through the candidate processing device.

In an embodiment, the topological score is a function of at least one further attribute selected in the list consisting of support of the network segments connecting the candidate processing device to each participating endpoints, which is selected in the following sub list: wireline, wireless.

power supply mode of the candidate processing device, which is selected in the following sub list: electric circuit, battery.

resource sharing mode of the candidate processing device, which is selected in the following sub list: dedicated resource, shared resource.

In an embodiment, the function of the topological score is a weighted sum of subscores represented by the selected attributes and the at least one end-to-end delay between a pair of the participating endpoints.

In an embodiment, the method further comprises a step of selecting a subset of the candidate processing devices, wherein the selecting is made as a function of the topological scores of the candidate processing devices, wherein the step of determining the availability score is performed only for each candidate processing device within the subset.

In an embodiment, the availability score is further determined as a function of a processing consumption of the video conferencing task for the availability score to represent a remaining available capacity of the candidate processing device under the assumption that the videoconferencing task is performed by the candidate processing device. Thanks to these features, the preferred candidate processing device executes the task without being overloaded.

In an embodiment, the method further comprises a step of storing the topological scores of all the candidate processing devices in a database. Thanks to these features, the topological scores of those candidate processing devices do not need to be re-calculated each time a processing device is removed or added to the computer network.

In an embodiment, the method further comprises a step of receiving a request for performing the video conferencing task and a step of sending to the preferred candidate processing device an activation message for performing the video conferencing task In an embodiment, the video conferencing task comprises at least one of:
mixing video streams transmitted by the participating endpoints,
switching video streams transmitted by the participating endpoints,
trans-coding video streams transmitted by the participating endpoints,
trans-scaling video streams transmitted by the participating endpoints,
relaying video streams transmitted by the participating endpoints.

In an embodiment, the method further comprises a step of receiving a request for performing the video conferencing task. Such a request may income from a call control server or from an endpoint.

In an embodiment, the method further comprises a step of sending to the selected candidate processing device an activation message for performing the video conferencing task.

In an embodiment, the method further comprises:
detecting that a processing device of the computer network to which a video conferencing task relating to a video conference was allocated is not able to continue performing the video conferencing task, and
wherein the above-described method is performed for re-allocating the video conferencing task to another candidate processing device within the computer network.

In an embodiment, the method is further performed in response to detecting that a candidate processing device has been added to the computer network.

In an embodiment, the invention also provides a task manager for allocating a video conferencing task related to a video conference within a computer network, wherein the computer network comprises a plurality of endpoints intended to participate in the video conference and a plurality of candidate processing devices, the task manager being configured to:
receive, from a call control server, a request for selecting a preferred candidate processing device,
for each of the candidate processing devices: determine a topological score, the topological score being a function of at least one end-to-end delay between a pair of participating endpoints through the candidate processing device,
for each candidate processing device within at least a subset of the candidate processing devices:
determine an availability score, the availability score being a function of an available processing capacity of the candidate processing device,
select a preferred processing device among the candidate processing devices as a function of the topological scores and of the availability scores, and
send to the call control server a response for allocating the video conferencing task to the preferred candidate processing device.

In an embodiment, the request for selecting a candidate processing device is an HTTP request.

In an embodiment, the response for allocating the video conferencing task to the selected candidate processing device is an HTTP request.

In an embodiment, such a task manager is further configured to read, from a database, the end-to-end delay between a pair of participating endpoints through the candidate processing device and the available processing capacity of the candidate processing device.

In an embodiment, such a task manager is further configured to store, in a database, the topological score of the candidate processing device. In an embodiment, such a task managing is further configured to store, in a database, the topological scores of all the candidate processing devices.

In an embodiment, the invention also provides a call system for video conferencing comprising
a task manager as described hereinabove, and
a call control server, the call control server being configured to send a launching message to the preferred candidate processing device for the preferred candidate processing device to execute the video conferencing task.

Another aspect of the invention is to involve hardware which does not have any relation to the video conference. Another aspect of the invention is to deliver rich video experience without using dedicated hardware and without overloading communications servers and endpoints with media processing operations.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

During a video conference, all the users participating to the video conference and their respective user devices are generally located in different geographical sites.

Figure 5:
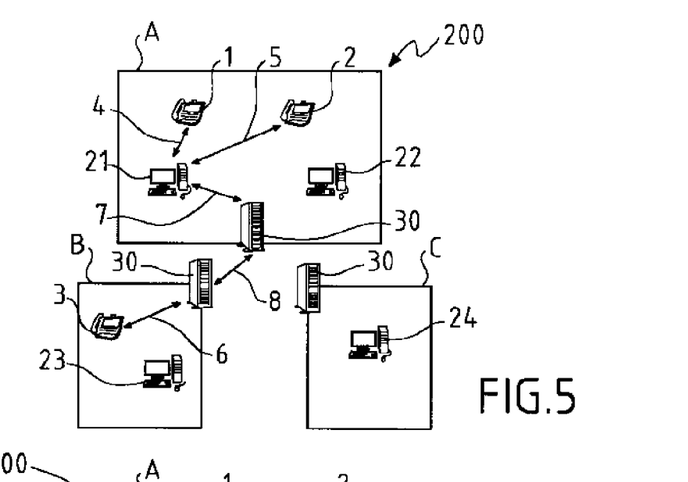
FIG. 5 illustrates schematically a computer network of a three-sites enterprise and video streams transmitted to and from a first processing device selected by the selection algorithm of FIG. 3.

For example, FIG. 5 represents the computer network 200 of an enterprise distributed in three sites connected via internet: site A, site B and site C. An endpoint 1, 2, 3 as illustrated on FIG. 5 is a user's device from which video streams are started and terminated during a videoconference. Each user device at each endpoint 1, 2, 3 includes a capture device, for instance a camera, to capture an individual video stream representing the user in his/her environment. For example, the endpoint 1, 2, 3 may comprise a PC, a laptop, a tablet, a deskphone, a mobile phone, a smartphone, a conference specialized hardware, or any other device having a capture device and a display device. All the captured individual video streams should be processed to generate one or more videoconference scenes, which in turn must be sent to all endpoints 1, 2 and 3 participating to the video conference. Each user watches the video conference scene on a personal display device.

Processing video streams comprise video conferencing tasks as video mixing, video switching, trans-coding, trans-scaling or other manipulations on video streams. The specificity of such video conferencing tasks is that the process of the appearance and disappearance of the video conferencing tasks is semi-stochastic. In some cases, for example for scheduled conferences it is possible to predict the time frame during which the video conferencing task will exist. In other cases, like for ad-hoc conferences, it is not possible.

The computer network 200 also comprises media servers 21, 22, 23 and 24 that are distributed on the different geographical sites A, B and C represented on FIG. 5. During a videoconference, bidirectional communication channel is established between a media server 21 and the endpoints 1, 2, 3 as represented by arrows 5, 6, 7, 8. Such a communication channel is able to carry a video stream in both directions. In use, the communication channel carries the captured individual video stream from the endpoints 1, 2, 3 to the media server 21 in one direction and the generated video conference stream from the media server 21 to the endpoints 1, 2, 3 in the other direction.

Elements which are identical or similar will be designated by the same reference numerals throughout the drawings.

Figure 1:
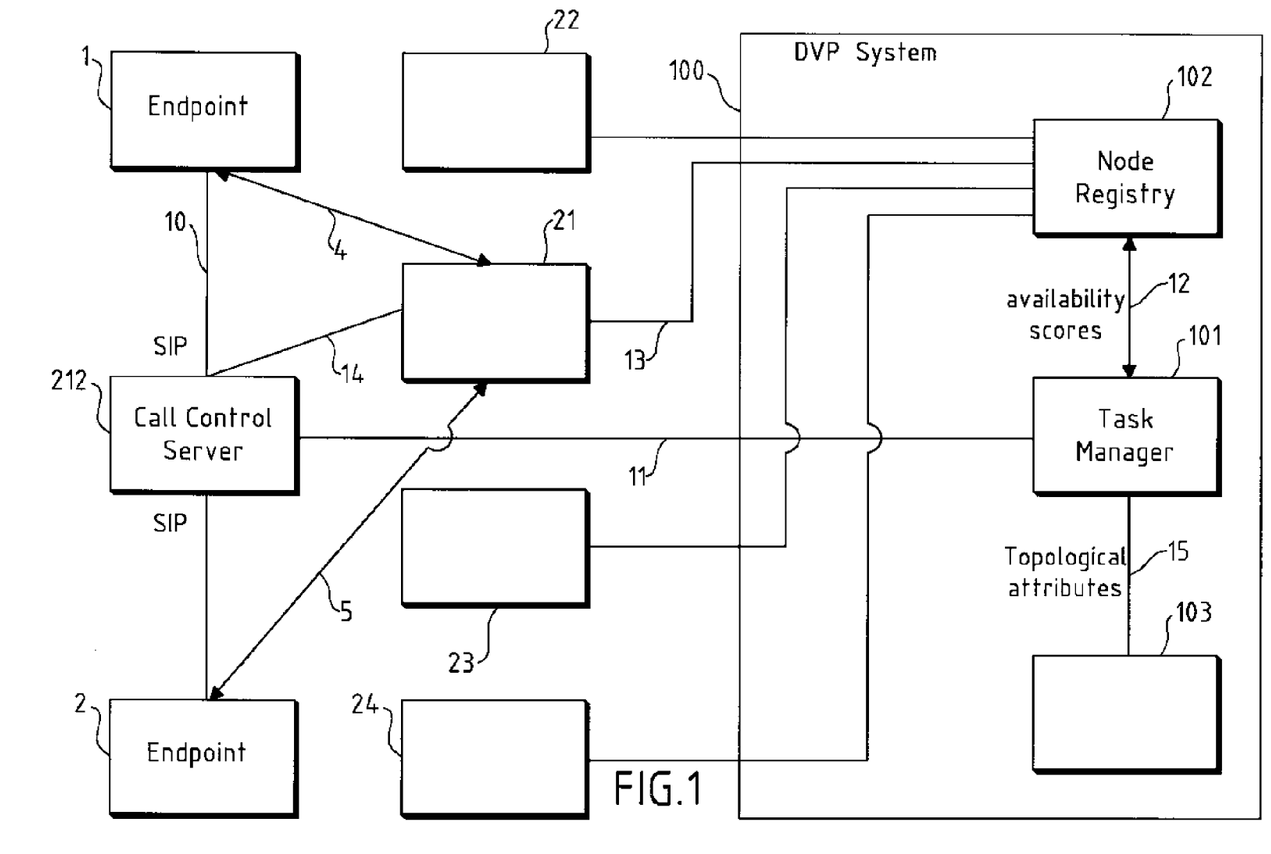
FIG. 1 illustrates schematically a network comprising a Distributed Video Processing (DVP) system controlling the performing of a processing on video streams between two endpoints.

With reference to FIG. 1, there will now be described a Distributed Video Processing (DVP) system 100 that may be employed to distribute such video conferencing tasks to processing devices 21, 22, 23 and 24 in real-time.

The DVP system 100 is connected to a set of processing device 21, 22, 23 and 24 distributed on a computer network such as the computer network of FIG. 5, e.g. media servers.

The DVP system 100 determines which processing device 21, 22, 23 and 24 will perform a given video conferencing task in an efficient and economical way. The DVP system 100 distributes the video conferencing tasks among the plurality of processing devices 21, 22, 23 and 24. Each processing device 21, 22, 23 and 24 performs the video conferencing tasks that are allocated to it by the DVP system 100.

The environment in which the DVP system 100 is operating is dynamic. Namely, a video conferencing task can be added or removed at any moment of time as a function of actions of the end-users. Besides the processing devices 21, 22, 23 and 24 can be added to or removed from the computer network at any moment of time, e.g. due to upgrades, maintenance and the like.

For this purpose, the DVP system 100 is configured to distribute and, if necessary, to re-distribute video conferencing tasks on the processing devices 21, 22, 23 and 24 as a function of the addition and removal of the video conferencing tasks and processing devices.

Namely, the DVP system 100 comprises a Task Manager 101 which is configured to perform a selection algorithm. The selection algorithm selects the best processing device in the plurality of candidate processing devices 21, 22, 23 and 24 for performing a given video conferencing task.

Figure 2:
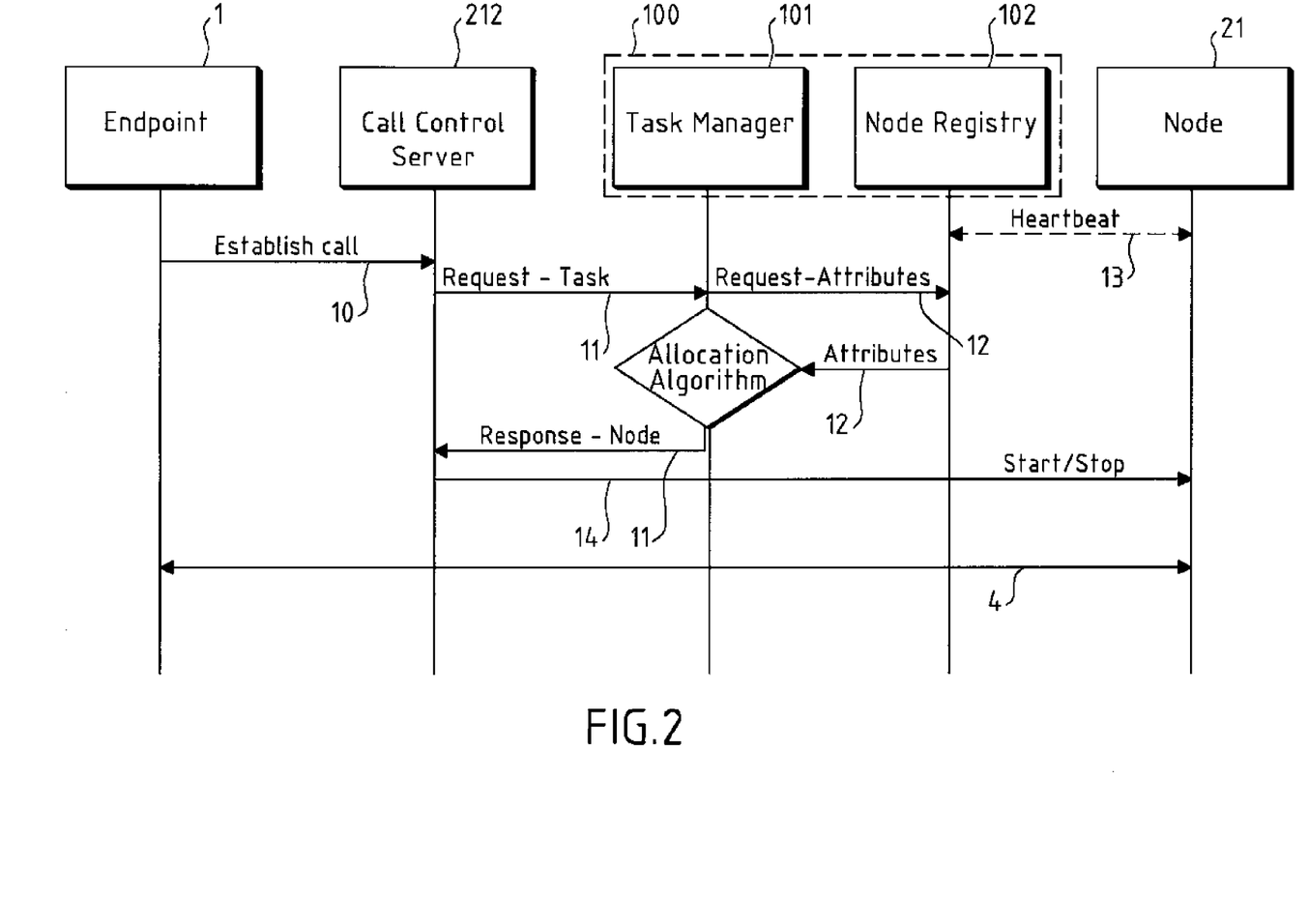
FIG. 2 is a call flow that may be implemented in the network of FIG. 1 between the DVP, a processing device and an endpoint.

With reference to FIGS. 1 and 2, the allocation of a video conferencing task to a selected candidate processing device of a computer network will be further described. The DVP system 100 comprises a Task Manager 101 dedicated to the performing of the selection algorithm, a database 103 for storing the topological attributes and/or the topological scores of the candidate processing devices 21, 22, 23 and the node registry 102 for the acquisition of the availability scores in real time. The node registry 102 and the database 103 are respectively connected to the Task Manager 101 in order to allow the Task Manager 101 performing the selection algorithm by loading the availability scores, the topological attributes and/or the topological scores of the candidate processing devices 21, 22, 23 and 24 from the node registry 102 and the database 103, as represented by arrows 12 and 15.

An endpoint 1 initiates the video conference by sending a request 10 for establishing call, for example by a SIP protocol, to the call control server 212. Then, the call control server 212 sends a request for a video conferencing task to the Task Manager 101. The Task Manager 101 then sends requests 12 and 15 to the Node registry 102 and the database 103 in order to load the availability scores, the topological attributes and/or the topological scores of each candidate processing device 21, 22, 23 and 24 and to perform the selection algorithm. For the sake of illustration, the selection algorithm selects the candidate media server 21. The Task Manager 101 controls the media server 21 by way of media server control messages 14. For example, the Task Manager 101 sends a node response 11 to the call control server 212 for enabling the call control server 212 to start the processing of the task by the processing device 21 through a media server control message 14. Then, the processing device 21 performs the task on video streams exchanged with the endpoint 1 and another endpoint 2 participating to the conference. For example, such an exchange is performed in accordance with the Real-Time Protocol (RTP) through the connections 4 and 5. In order to allow the node registry 102 to be informed in real time to any change in the availability scores of the candidate processing devices, the node registry 102 is connected to the candidate processing devices and performs an heartbeat updating exchange 13.

In an embodiment, the selection algorithm implemented by the Task Manager 101 will be described with reference to FIG. 3. For the sake of clarity a video conferencing task is denoted by "T". The selection algorithm will calculate a cost function for the performing of the video conferencing task T on each candidate processing device. The cost function is named Full Simulation Result (FSR). The FSR of a candidate processing device 21, 22, 23 and 24 is a function of a topological score taking into account topological attributes of the candidate processing device and of an availability score of the candidate processing device with regard to the video conferencing task T. The topological score is named Static Simulation Result (SSR) and is estimated as a function of the topological attributes in order to represent by a numerical value the topology of video conference connections in the network through the candidate processing device which is contemplated. The availability score is named Dynamic Simulation Result (DSR) and represents by a numerical value the fitting of the available processing capacity of the candidate processing device and the processing consumption of the task intended to be performed by the candidate processing device.

For the sake of clarity, the following notation conventions will be used in the following: SSR, DSR and FSR of video conferencing task T deployed on a candidate processing device Pi is denoted by respectively "SSRi(T)", "DSRi(T)" and "FSRi(T)".

The selection algorithm performs the following steps:

In an initializing step 301, the selection algorithm selects a first candidate processing device $P_0$. Then, in a calculation step 302, the selection algorithm calculates the $SSR_i(T)$. Then, in a calculation step 303, the selection algorithm calculates the $DSR_i(T)$. Then, in a calculation step 304, the selection algorithm calculates the $FSR_i(T)$ as a function of the calculated $SSR_i(T)$ and the calculated $DSR_i(T)$. In an incrementation step 305, while testing 306 that the FSR(T) have not been already calculated for all the available candidate processing devices of the computer network, the selection algorithm selects another candidate processing device $P_j$, and, in an iterative loop 308, the selection algorithm performs back the steps 302 to 306. When the test 306 is negative, the selection algorithm performs a further step 307 of selecting the candidate processing device $P_k$ for which the $FSR_k(T)$ is the best of all the FSR(T) calculated for all the candidate processing devices. The selected candidate processing device $P_k$ is therefore the best candidate processing device for performing the video conferencing task T as its cost function is the best.

Now, based on the example pictured on FIG. 5, the calculation of the topological score will be further explained with reference to an example of a network topology. The computer network 200 pictured comprises a Local Area Network (LAN) on each geographical site A, B and C, wherein three endpoints participating to a video conference 1, 2 and 3 are located in the LANs. The computer network 200 further comprises a Wide Area Network (WAN) that interconnects the LANs at network interfaces 30. In the computer network 200, any two endpoints 1, 2 and 3 and a candidate media server 21, 22, 23 and 24 are connected by way of a path constituted by a LAN segment which include sub paths 4 and 5 in the case in which the two endpoints 1 and 2 and a candidate media server 21 are belonging to the same geographical site A, namely the same LAN. By contrast, the path is constituted of both LAN segments which include sub paths 4, 6 and 7 and a WAN segment which include the sub path 8 in the case in which the two endpoints 1 and 3 and the candidate media server 21 are belonging to two different geographical sites A and B, namely two different LANs connected by the WAN. The WAN segment is delimited by the network interface 30 of the site A and the network interface 30 of the site B.

Calculation of the Topological Score:

The calculation step 302 of the topological score SSR takes into account topological attributes of a candidate media server. Such topological attributes may be selected in the following non-exhaustive list, illustrated for the sake of clarity for each by the non-limitative example of the selection of the candidate media server 21 of the FIG. 5:

at least one end-to-end delay between a pair of participating endpoints 1, 2 through the candidate media server 21. In an embodiment, the estimation of the topological score takes into account an average video conference value of the end-to-end delay of the video streams concerned by the video conferencing task between all pairs of the participating endpoints 1, 2 and 3 through the candidate media server 21. In another embodiment, the estimation of the topological score takes into account a longest video conference delay, which is the longest of the end-to-end delays between all pairs of the participating endpoints 1, 2 and 3 through the candidate media server 21.

bandwidth consumption of the video conference on the WAN segments 8 of a path connecting each participating endpoint through the candidate media server.

support of the network segments connecting the candidate media server 21 to each participating endpoints 1, 2 and 3, which is selected in the following sub list: wireline, wireless.

power supply mode of the candidate media server 21, which is selected in the following sub list: electric circuit, battery.

resource sharing mode of the candidate media server 21, which is selected in the following sub list: dedicated resource, shared resource.

All the topological attributes described hereinabove are different in their importance and may be weighted in the topological score. In an embodiment, the topological score is expressed as an integer number in the range [0, 100] thanks to estimation methods which will now be described for each of the previous topological attributes.

These estimation methods namely aim to represent a numerical contribution of the topological attributes to the topological score of a candidate media server $P_i$. In an embodiment, these numerical contributions are normalized in order to be taken into account with each other in the same topological score.

The real end-to-end delay is estimated along a selected path for connecting at least a pair of endpoints through the candidate media server $P_i$. For example, with reference to FIG. 5, the endpoint 1 and the endpoint 2 are connected through the media server 21. The end-to-end delay is the delay that a video stream emitted from the endpoint 1 takes to reach endpoint 2 through the media server 21. Therefore, the end-to-end delay is a delay contribution of a LAN segment comprising the sub paths 4 and 5. For example, with reference to FIG. 5, the endpoint 1 and the endpoint 3 are connected through the media server 21. The end-to-end delay is the delay that a video stream emitted from the endpoint 1 takes to reach endpoint 3 through the media server 21. Therefore, the end-to-end delay is the sum of delay contributions of a LAN segment comprising the sub paths 4 and 7, a WAN segment comprising the sub path 8 and a LAN segment comprising the sub path 6. The delay contribution of a WAN segment is longer than the delay contribution of a LAN segment. For example, the delay contribution of a WAN segment is higher than 100 ms whereas the delay contribution of a LAN segment is lower than 10 ms. The optimal value of maximum theoretical end-to-end delay is 0. This value is not achievable in practice but can be considered as the end-to-end delay in some ideal system. As the best end-to-end delay is the lowest end-to-end delay, and in order to be comparable to other topological attributes, the estimation of the topological score may be performed by taking into account a normalized end-to-end delay value instead of the real end-to-end delay, as follows:

normalized end-to-end delay=real end-to-end delay*100/maximum end-to-end theoretical delay A maximum theoretical end-to-end delay can be defined in different ways. For example, ITU-T recommendation G.114 can be used. This recommendation states acceptable voice delays in interactive applications. An end-to-end delay of lower than 150 ms is considered as acceptable, whereas an end-to-end delay higher than 400 ms is considered as inacceptable. An end-to-end delay having values between 150 ms and 400 ms imply that the video conferencing will face some quality issues. Such a way the value 400 is set as a maximum theoretical end-to-end delay. This means that all end-to-end delays higher than 400 ms will not be distinguishable from each other as all the resulting values higher than 100 are rounded to 100.

The optimal theoretical value for the bandwidth consumption of the video conference on the WAN segments connecting the candidate media server to each participating endpoint is also 0 even if it's not achievable in practice. For the same reasons as for the end-to-end delay, a normalized value of the bandwidth consumption of the video conference on the WAN segments is considered as follows:

normalized WAN bandwidth value=real WAN bandwidth*100/maximum theoretical WAN bandwidth.

The value of the maximum theoretical WAN bandwidth can be taken as the sum of bandwidth of all the video streams of a given video conferencing task. This value is known at the moment of creation of the video conferencing task.

Figure 6:
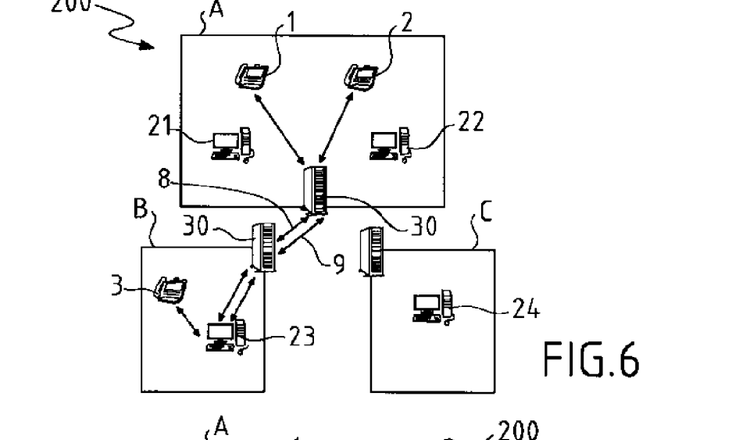
FIG. 6 illustrates schematically the computer network of FIG. 5, in which the video streams are transmitted to and from a second processing device which is not selected by the selection algorithm of FIG. 3.

For example, with reference to FIG. 6, for a video conferencing task of trans-coding of video streams emitted by two participating endpoints 1 and 2 executed by a media server 23, the endpoint 1 produces a video input stream of 1 Mbps and consumes a video output stream of 1 Mbps. The endpoint 2 produces and consumes video streams of 2 Mbps each. Such a way, the input of the media server 23 is 3 Mbps, which corresponds to the output streams of both endpoints 1 and 2. The output of the media server is also 3 mbps, which corresponds to the input streams of both endpoints 1 and 2. Both endpoints 1 and 2 use a WAN segment 8, 9 in order to connect the media server 23 because the media server 23 belongs to the geographical site B whereas the endpoints 1 and 2 belong to the geographical site A. In such a hypothesis, the value of the maximum theoretical WAN bandwidth can be set as the sum of the bandwidths of all the video streams described hereinabove in order to estimate a worst case for normalization of real values of bandwidth consumption of the video conference on the WAN segments 8, 9. Such a sum is equal to 6 Mbps. This value can be used as the divisor for normalization.

The attribute of the support of the network segments takes into account whether the candidate processing device 21 uses wireline or wireless, for example Wi-Fi, network connectivity. Due to the binary nature of the attribute, if the support if wireline, a value may be added to the topological score of the candidate processing device 21 corresponding to a logical positive attribute. By contrast, if the support is wireless, the value which is added corresponds to a negative logical attribute.

The attribute of the power supply mode takes into account whether a candidate processing device 21 is powered by an electric circuit or by a battery. Due to the binary nature of the attribute, a value may be added to the topological score of the candidate processing device 21 if an electric circuit is used, which corresponds to a positive logical attribute. By contrast, the value which is added in the case the candidate processing device 21 is powered by a battery corresponds to a negative logical attribute.

The attribute of the resource sharing mode takes into account whether the candidate processing device 21 is shared with other user activities non-related to video conferencing. Due to the binary nature of the attribute, a value is added if the candidate processing device 21 is dedicated, which corresponds to a positive logical attribute. By contrast, the value which is added if the candidate processing device 21 shares resources for other user activities corresponds to a negative logical attribute.

For conformity with the numerical contributions of the other topological attributes, a value of 0 may be set as the value of the positive logical attribute and a value of 100 as the value of the negative logical attribute. The normalization is therefore not needed due to the binary nature of these attributes.

Possible normalization for each of the values of the topological attributes described hereinabove is summed up in the below table:

| Attribute name | Theoretical ideal value | Theoretical worst value | Normalization divisor |
| --- | --- | --- | --- |
| End-to-end delay (ms) | 0 | ∞ | 400 ms, if the end-to-end delay is lower than 400 (otherwise, the normalization divisor is the highest end-to-end delay) |
| bandwidth consumption on the WAN segments (Mbps) | 0 | Sum of all possible video streams | Sum of all possible video streams |
| support of the network segments | 0 | 100 | Not needed |
| power supply mode | 0 | 100 | Not needed |
| resource sharing mode | 0 | 100 | Not needed |

With regard to topological attributes, an ideal candidate processing device is a processing device for which the values of the topological attributes are all equal to zero.

The topological score $SSR_j$ of a $j^{th}$ candidate processing device is a function of at least one of the topological attributes described hereinabove. For example, the $SSR_j$ is expressed as a weighted sum as follows:

$$SSR_j = \sum_{i=1}^{M} w_i a_{ij}$$

wherein a number M of different topological attributes is considered, wherein the $i^{th}$ attribute is weighted by a value $w_i$, and wherein the value $a_{ij}$ represents the normalized value of the $i^{th}$ attribute calculated by the following formula:

normalized value of the $ith$ attribute = real value of the $ith$ attribute $\times \dfrac{100}{\text{normalization divisor of the } ith \text{ attribute}}$ as described for the examples of topological attributes described hereinabove.

In another embodiment, the $SSR_j$ is expressed as a polynomial function of the topological attributes described hereinabove.

Topological attributes are rarely changed during an existence of a video conferencing task, for example during several hours. Therefore, in an embodiment represented with reference to FIG. 1, the topological scores SSR and/or the topological attributes of all the candidate processing devices are stored in a database 103 which is connected to the Task Manager 101 in order to be loaded and used when the Task Manager 101 performs the selection algorithm.

Calculation of the Availability Score:

In the step 303 of the selection algorithm, the Task Manager 101 is also configured to calculate the availability score DSR. The availability score of a candidate processing device is a function of an available processing capacity of the candidate processing device.

By contrast with the topological score of a candidate processing device, the availability score of a candidate processing device is changing in real time. For example, during a video conference, a third party can use some processing capacity of a processing device being processing a video conferencing task T by launching other processing activities than the video conferencing task T.

The total processing capacity of the candidate processing device depends on the type of the candidate processing device. Therefore, the selection algorithm performs the simulation of the remaining available processing capacity of the candidate processing device assuming that the candidate processing device performs the video conferencing task T. An assumed total processing consumption is the sum of the processing consumption of current other processing activities than the video conferencing task T and the processing consumption of the video conferencing task T. The remaining available processing capacity is the difference between the total processing capacity of the candidate processing device and the total processing consumption due to all processing activities on the candidate processing device, including the video conferencing task.

With regard to the availability score, the best candidate processing device is the one having a highest remaining processing capacity in the assumption that the best candidate processing device processes the video conferencing task T. In other words, the best candidate processing device is the one having a lowest total processing consumption in the assumption that the best candidate processing device processes the video conferencing task T. Indeed, selecting the candidate processing device having the lowest total processing consumption allows anticipating a possible sudden increase of processing consumption due to the eventual launching of other activities on the candidate processing device.

In order to estimate the processing consumption of a particular processing device due to a particular type of video conferencing task, a preliminary step of simulation is performed. In the simulation, each type of video conferencing tasks is executed on each type of processing device. For each alternative, the processing consumption level is collected and stored in a database, for example in the node registry 102 of FIG. 1, in order to be usable in the step 303 of the selection algorithm. For example, the following table sums up some processing consumption for three different types of video conferencing task and three different types of processing device:

| Platform Type of Task | PC Intel core Quad2 CPU @ 2.40 GHz | IPhone 5S | ALUE 8082 deskphone |
|---|---|---|---|
| Mixing 3 H264 streams in HD | processing consumption X1 | Not possible | Not possible |
| Trans-coding H264 to VP8 in HD | processing consumption X2 | Not possible | processing consumption Y1 |
| Trans-scaling H264 from HD to CIF | processing consumption X3 | Not possible | processing consumption Y2 |

Wherein X1, X2, X3, Y1 and Y2 are different numerical values of the processing consumption of the contemplated video conferencing task on the contemplated processing device.

In an embodiment, these numerical values are normalized in order to be taken into account in a comparable way as the topological attributes values.

Such a table is stored in the node registry 102, and the Task Manager 101 is further configured to load the processing consumption values stored for performing the step 303 of the selection algorithm.

Similarly as for the topological score, the best availability score is the lowest availability score among all the availability scores of all the candidate processing devices of the computer network. For this purpose, the availability score is equal to a normalized value of the total processing consumption.

Selection of a Candidate Processing Device:

The Task Manager 101 is further configured to select a candidate processing device. The selection is performed in step 307 thanks to a comparison of the $FSR_i$ of each $i^{th}$ candidate processing device in order to determine which $FSR_i$ is the best. The FSR is a numerical value which combines both SSR and DSR in order to compare the distribution of a given video conferencing task on different candidate processing devices with regard to both topological and consumption considerations.

Below are some examples of FSR functions:

FSR=(SSR+DSR)/2

$FSR(T)=[k*SSR(T)+m*DSR(T)]/n$, where $k$, $m$, $n$ are defined numerical values.

FSR is a polynomial function of SSR and DSR.

FSR is a quadratic mean of the SSR and the DSR.

In an embodiment, the FSR may have values in the range [0, 100] and the best value of FSR is the nearest from zero.

Figure 3:
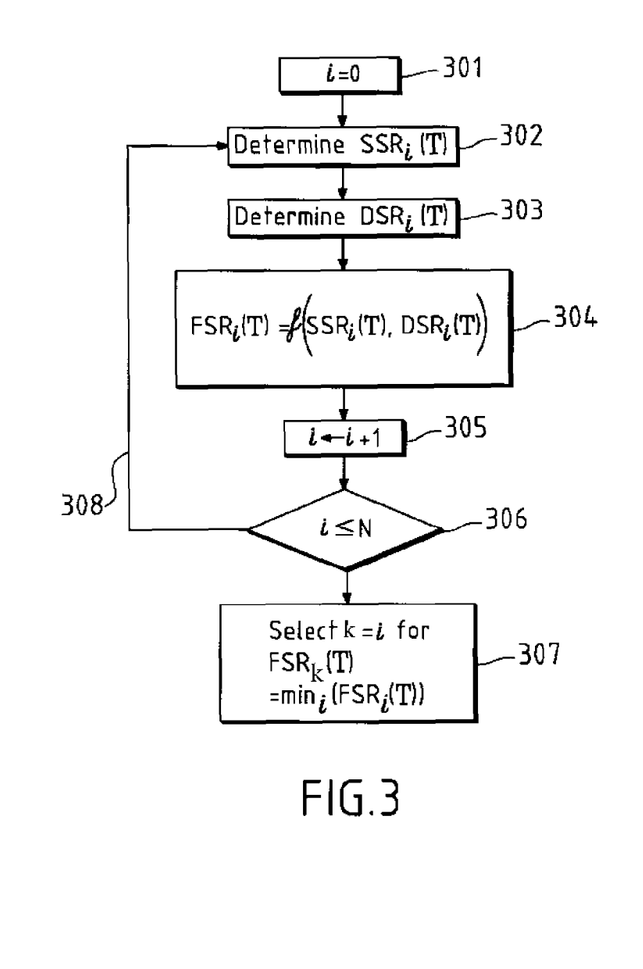
FIG. 3 is a diagram representing the steps of an selection algorithm performed by the DVP system for selecting which processing device should perform a processing on video streams.

For the sake of illustration, the selection algorithm pictured on FIG. 3 will be performed for a video processing task T intended to allow a video conference between the endpoints 1, 2 and 3 of the FIG. 5. Four candidate media servers 21, 22, 23 and 24 are available in the computer network 200.

The topological score SSR is first calculated for each candidate media servers 21, 22, 23 and 24 by the step 302. For the sake of illustration, the only topological attribute taken into account is the average video conference delay, which is the average value of the end-to-end delay between all pairs of the participating endpoints 1, 2 and 3 through the candidate media server tested by the selection algorithm.

Any path constituted of both LAN segments and WAN segments has a higher end-to-end delay than a path constituted of LAN segments. Therefore, the average value of the end-to-end delay between all pairs of the participating endpoints 1, 2 and 3 is lowest for the media servers 21 and 22 than for the media servers 23 and 24. Indeed, the required number of WAN segments 8 is equal to one for transmitting the video stream emitted by the endpoint 3 through the WAN in the example pictured on FIG. 5, whereas the required number of WAN segments 8, 9 is doubled in the example pictures on FIG. 6. Indeed, the video streams of the endpoints 1 and 2 have to travel through the WAN to access the media server 23. Similarly, all the video streams have to travel through the WAN to reach the media server 24. Therefore, two candidate media servers 21 and 22 have an equal topological score SSR which is lowest than the topological scores of the media servers 23 and 24.

Now, the selection algorithm performs the calculation of the availability score DSR in the step 303. The candidate media server 21 has a lower total processing consumption in the assumption that the video conferencing task T is performed than the candidate media servers 22, 23 and 24. Therefore, in the calculation step 304, the selection algorithm determines that the candidate media server has the lowest FSR which is equal for this example to (SSR+DSR)/2. Therefore, the candidate media server 21 is the best to perform the video conferencing task T.

Figure 4:
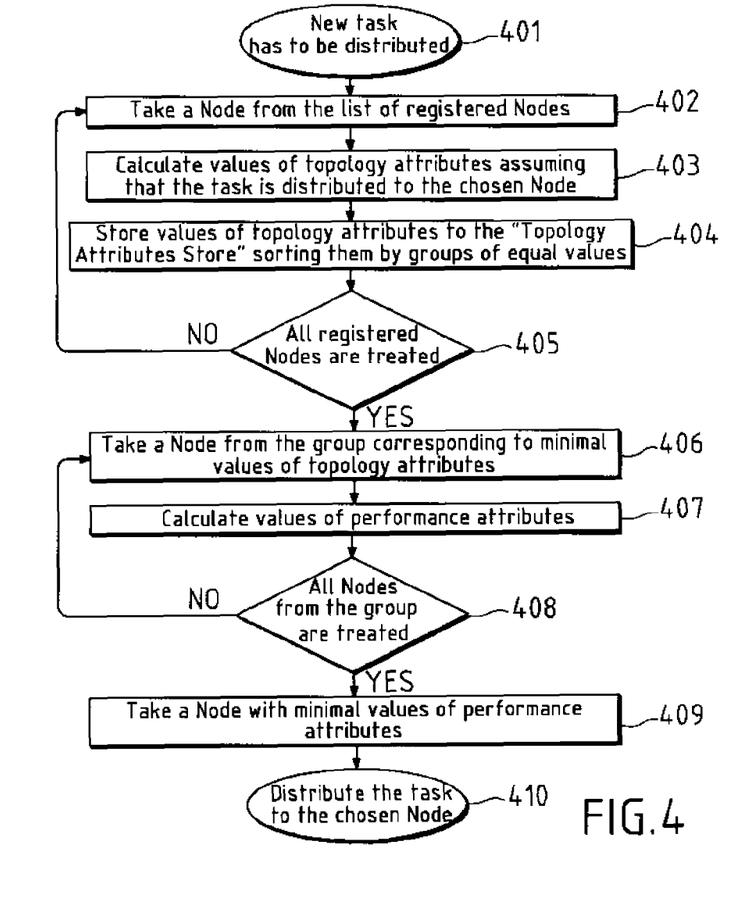
FIG. 4 is a diagram representing a variant for the selection algorithm of FIG. 3 in an embodiment.

In another embodiment for the selection algorithm in which the processing devices are nodes and the availability score is a function of performance attributes, with reference to FIG. 4, the selection algorithm performs:
 detecting that a new task has to be distributed in a step 401, wherein the task is a video conferencing task,
 taking a node from a list of registered nodes in a step 402, wherein the node is a candidate processing device,
 calculating the values of the topology attributes by assuming that the task is distributed to the chosen node in a step 403, wherein the chosen node is the node selected in the step 402,
 storing the values of topology attributes to the Topology Attributes Store sorting them by groups of equal values in a step 404, wherein the Topology Attributes Store is an embodiment of the database 103,
 testing if all the registered nodes are treated in a step 405, wherein a treated node is a node which has been already selected in the step 402, and if the test is negative, iterating to the step 402, otherwise continuing to a step 406,
 taking a node from the group corresponding to minimal values of topology attributes in the step 406,
 calculating values of performance attributes in a step 407,
 testing that all nodes from the group corresponding to minimal values of topology attributes are treated in a step 408, and if the test is negative, iterating to the step 406, otherwise continuing to a step 409,
 taking a node with minimal values of performance attributes in the step 409,
 distributing the task to the chosen node in a step 410.

For example, as seen with reference to FIG. 5, three sorted groups of candidate media servers have equal topology attributes and are stored in the database 103:
 1: Media server 21, Media server 22
 2: Media server 23
 3: Media server 24 In step 406, the selection algorithm successively selects the candidate media server 21 and then 22 which have the lowest equal value of topological scores in order to calculate for each the availability score in step 303 without calculating the availability scores of the candidate media servers 23 and 24.

The selection algorithm then compare in step 409 the availability scores of the candidate media servers 21 and 22 and selects the candidate media server 21 which has a lower availability score than the candidate media server 22.

Then, in a step 410, the selection algorithm allocates the video conferencing task T to the selected candidate media server 21.

Figure 7:
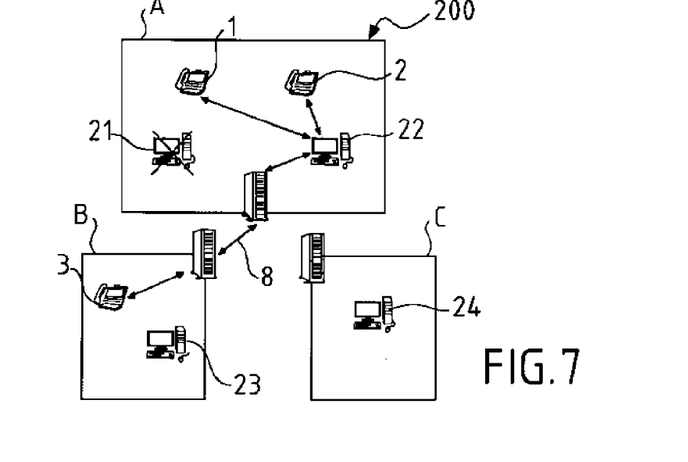
FIG. 7 illustrates schematically the computer network of FIG. 5, in which the video streams are transmitted to a processing device selected by the selection algorithm of FIG. 3 after the first processing device of the computer network has been removed.

With reference to FIG. 7, the video conferencing task T allocated to the media server 21 as represented on FIG. 5 has to be re-distributed to another media server of the computer network 200 because a third party has turned off the media server 21.

The selection algorithm represented on FIG. 4, performs again the steps 406 to 410. Recalculation of the topology attributes is not needed as the values have not changed, by contrast with the values of the performance attributes which must be recalculated. In this example, the topological score of the candidate media server 22 is lower than the topological score of the candidate media servers 23 and 24 and therefore the video conferencing task T is distributed to the selected media server 22.

The conventions allowing representing the topological attributes and the availability score by numerical values may be various. For example, in an embodiment, the best values of the topological attributes are set to 100 instead of zero and the availability score of a particular candidate processing device is calculated as a function of the remaining available processing capacity instead of the assumed total processing consumption, such that the best topological and availability scores and FSR are the highest ones. Similarly, the topological attributes, the availability score and the FSR take values in the numerical range [0, 100] or in any range as for example [0,1] or for example [−1, 1]. Similarly, the topological attributes, the availability score and the FSR may take values in different numerical ranges from each other.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

The endpoints, call control server, processing devices e.g. media servers, DVP system, node registry, task manager, database described hereinabove may be implemented through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, central processing unit (CPU), digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. The endpoints, call control server, processing devices, DVP system, node registry, task manager and database described hereinabove may be implemented in a unitary manner or in a distributed manner.

In the claims, any reference signs placed between parentheses shall not be construed as limiting the scope of the claims.

The invention claimed is:

1. A method for allocating a video conferencing task within a computer network, wherein the computer network comprises a plurality of Local Area Networks (LANs) interconnected by a Wide Area Network (WAN), wherein the video conferencing task relates to a video conference, wherein the computer network comprises a plurality of endpoints intended to participate in the video conference and a plurality of candidate processing devices, wherein the participating endpoints and the candidate processing devices are located in the LANs, and wherein at least one candidate processing device is one of the endpoints of the computer network, the method comprising:
for each of the candidate processing devices:
determining a topological score for the candidate processing device, the topological score being a function of at least one end-to-end delay between a pair of participating endpoints through the candidate processing device, wherein determining the topological score comprises:
selecting a path for connecting the pair of participating endpoints through the candidate processing device, the path consisting of at least one of at least one LAN segment located in a LAN and at least one WAN segment located in the WAN,
allocating a delay contribution to each LAN segment of the selected path,
allocating a delay contribution to each WAN segment of the selected path, wherein the delay contribution of a WAN segment is longer than the delay contribution of a LAN segment,
determining the end-to-end delay between the endpoints of the pair of participating endpoints as a sum of the delay contributions of the at least one of at least one LAN segment and at least one WAN segment constituting the path,
for each candidate processing device within at least a subset of the candidate processing devices:
determining an availability score for the candidate processing device, the availability score being a function of an available processing capacity of the candidate processing device,
detecting that a processing device of the computer network to which a video conferencing task relating to a video conference was allocated is not able to continue performing the video conferencing task,
selecting a preferred processing device among the candidate processing devices other than the processing device which is not able to continue performing the video conferencing task as a function of the topological scores and of the availability scores, and
re-allocating the video conferencing task for the video conference between the pair of participating endpoints to the preferred processing device.

2. The method according to claim 1, wherein the topological score is a function of a longest video conference delay, wherein the longest videoconference delay is the longest of the end-to-end delay between all pairs of the participating endpoints through the candidate processing device.

3. The method according to claim 1, wherein the topological score is a function of the bandwidth consumption of the video conference on the WAN segments connecting the candidate processing device to each participating endpoint.

4. The method according to claim 1, further comprising a step of selecting a subset of the candidate processing devices, wherein the selecting is made as a function of the topological scores of the candidate processing devices, wherein the step of determining the availability score is performed only for each candidate processing device within the subset.

5. The method according to claim 1, wherein the availability score is further determined as a function of a processing consumption of the video conferencing task for the availability score to represent a remaining available capacity of the candidate processing device under the assumption that the videoconferencing task is performed by the candidate processing device.

6. The method according to claim 1, further comprising a step of storing the topological scores of all the candidate processing devices in a database.

7. The method according to claim 1, wherein the method is performed in response to detecting that a candidate processing device has been added to the computer network.

8. A task manager for allocating a video conferencing task related to a video conference within a computer network, wherein the computer network comprises a plurality of Local Area Networks (LANs) interconnected by a Wide Area Network (WAN), wherein the computer network comprises a plurality of endpoints intended to participate in the video conference and a plurality of candidate processing devices, and wherein the participating endpoints and the candidate processing devices are located in the LANs, the task manager being configured to:
receive, from a call control server, a request for selecting a preferred processing device among the candidate processing devices,
for each of the candidate processing devices:
determine a topological score, wherein the topological score is a function of an average video conference delay, wherein the average video conference delay is the average value of an end-to-end delay between all pairs of the participating endpoints through the candidate processing device, wherein determining the end-to-end delay between a pair of participating endpoints through the candidate processing device comprises:
selecting a path for connecting the pair of participating endpoints through the candidate processing device, the path consisting of at least one LAN segment located in a LAN and at least one WAN segment located in the WAN, allocating a delay contribution to each LAN segment of the selected path, allocating a delay contribution to each WAN segment of the selected path, wherein the delay contribution of a WAN segment is longer than the delay contribution of a LAN segment, determining the end-to-end delay between the endpoints of the pair of participating endpoints as a sum of the delay contributions of the at least one LAN segment and at least one WAN segment constituting the path, for each candidate processing device within at least a subset of the candidate processing devices:

determine an availability score, the availability score being a function of an available processing capacity of the candidate processing device, select a preferred processing device among the candidate processing devices as a function of the topological scores and of the availability scores, and send to the call control server a response for allocating the video conferencing task to the preferred candidate processing device.

9. The task manager according to claim 8, further configured to read, from a database, the end-to-end delay between a pair of participating endpoints through the candidate processing device and the available processing capacity of the candidate processing device.

10. The task manager according to claim 8, further configured to store, in a database, the topological score of the candidate processing device.

11. A call system for video conferencing comprising the task manager according to claim 8, and a call control server, the call control server being configured to send a launching message to the preferred candidate processing device for the preferred candidate processing device to execute the video conferencing task.

\* \* \* \* \*